United States Patent
Krall

(10) Patent No.: US 7,490,805 B2
(45) Date of Patent: Feb. 17, 2009

(54) SAND BOTTLE HANDLE AND MOUNTING FEATURE

(75) Inventor: Richard Krall, Augusta, GA (US)

(73) Assignee: Textron Inc., Providence, RI (US)

( * ) Notice: Subject to any disclaimer, the term of this patent is extended or adjusted under 35 U.S.C. 154(b) by 30 days.

(21) Appl. No.: 11/373,874

(22) Filed: Mar. 10, 2006

(65) Prior Publication Data

US 2007/0210227 A1    Sep. 13, 2007

(51) Int. Cl.
*A47K 1/08* (2006.01)

(52) U.S. Cl. .................. 248/311.2; 220/696; 220/761; 16/110.1; 215/395; 215/396; 294/29; 294/30

(58) Field of Classification Search ............. 248/311.2, 248/312, 312.1; 16/114, 110.1; 222/93, 222/105, 148 A; 294/29, 30, 34; 215/100 A, 215/396, 395; 220/696, 710.5, 741, 752, 220/756, 757, 758

See application file for complete search history.

(56) References Cited

U.S. PATENT DOCUMENTS

| | | | | |
|---|---|---|---|---|
| 2,017,319 A * | 10/1935 | McMullen | ............... | 248/312.1 |
| 3,224,644 A * | 12/1965 | Davis | .......................... | 222/162 |
| 3,592,501 A * | 7/1971 | Stokes et al. | .................. | 294/32 |
| 3,648,958 A * | 3/1972 | Araujo | ........................ | 248/105 |
| 3,920,140 A * | 11/1975 | Kiser | .......................... | 215/399 |
| 4,088,250 A | 5/1978 | Schaefer | | |
| 4,153,089 A | 5/1979 | Veilleux | | |
| 4,366,922 A | 1/1983 | Levine et al. | | |
| 4,640,895 A * | 2/1987 | Davis | ....................... | 435/304.2 |
| 4,660,876 A * | 4/1987 | Weldin et al. | .................. | 294/33 |
| 5,013,074 A * | 5/1991 | Galle | .......................... | 294/33 |
| 5,060,832 A | 10/1991 | Link | | |
| 5,067,637 A | 11/1991 | Aurness et al. | | |
| 5,101,744 A | 4/1992 | Nolan | | |
| 5,105,958 A * | 4/1992 | Patton | ....................... | 215/388 |
| 5,131,570 A | 7/1992 | Sawyer, III | | |
| 5,251,777 A * | 10/1993 | McMahon | .................. | 220/480 |
| 5,326,006 A * | 7/1994 | Giard, Jr. | ..................... | 224/414 |
| 5,419,478 A | 5/1995 | Mauro et al. | | |
| 5,484,128 A * | 1/1996 | Franco, Sr. | ............... | 248/311.2 |
| 5,624,064 A * | 4/1997 | McGee, Jr. | .................. | 224/414 |
| 6,267,269 B1 | 7/2001 | Kates | | |
| 6,273,283 B1 * | 8/2001 | Terrana et al. | ............... | 215/383 |
| 6,315,174 B1 | 11/2001 | Bowker et al. | | |
| D463,225 S | 9/2002 | Winkler | | |
| D463,226 S | 9/2002 | Winkler | | |
| 6,618,987 B1 | 9/2003 | Bowker et al. | | |
| 6,637,153 B2 | 10/2003 | Gies | | |

(Continued)

*Primary Examiner*—Amy J. Sterling
(74) *Attorney, Agent, or Firm*—Harness, Dickey & Pierce, P.L.C.

(57) ABSTRACT

A sand bottle assembly on a golf car includes a bottle and a mounting bracket. The bottle is defined by a longitudinal hollow body having a bottom portion and a top portion. The hollow body defines a vertical axis. A spout is formed at the top portion and is adapted to dispense sand contained in the hollow body. An extension portion is disposed along a sidewall of the hollow body. The extension portion includes a raised sidewall portion. The mounting bracket is adapted to be connected to the golf car and matingly receive the extension portion of the bottle in an installed position. The mounting bracket defines an engaging portion adapted to engage and retain the raised sidewall of the extension portion in a secure position along the vertical axis in the installed position.

20 Claims, 3 Drawing Sheets

U.S. PATENT DOCUMENTS

| | | |
|---|---|---|
| 6,637,355 B2 | 10/2003 | Springs |
| D482,193 S | 11/2003 | Hahn |
| D482,751 S | 11/2003 | Penton |
| 6,659,027 B1 | 12/2003 | Garcia |
| 6,739,486 B2 * | 5/2004 | Winkler ................ 222/608 |
| 6,874,836 B1 | 4/2005 | Feser |
| 7,044,344 B2 | 5/2006 | Winkler |
| 7,066,363 B2 | 6/2006 | Lecoq |
| 7,156,269 B1 | 1/2007 | Meyer et al. |
| 7,207,538 B2 * | 4/2007 | Kent-Fawkes ........ 248/311.2 |
| 7,216,785 B1 * | 5/2007 | Meyer et al. ............ 222/568 |
| 2002/0033402 A1 | 3/2002 | Winkler |
| 2002/0037779 A1 | 3/2002 | Meyer et al. |
| 2002/0056728 A1 | 5/2002 | Winkler |
| 2002/0070324 A1 | 6/2002 | Huang |
| 2002/0109062 A1 * | 8/2002 | Fowler ................ 248/311.2 |
| 2003/0019992 A1 * | 1/2003 | Webb .................. 248/311.2 |
| 2004/0129731 A1 | 7/2004 | Hahn |
| 2004/0211803 A1 | 10/2004 | Powell et al. |
| 2005/0097816 A1 | 5/2005 | Elder et al. |
| 2005/0178305 A1 | 8/2005 | Kojima |
| 2005/0224539 A1 | 10/2005 | Hardy et al. |
| 2006/0266772 A1 | 11/2006 | Martin et al. |

* cited by examiner

SAND BOTTLE HANDLE AND MOUNTING FEATURE

TECHNICAL FIELD

The present invention relates to golf cars and more specifically to a sand bottle mounting arrangement on a golf car.

BACKGROUND

Golf cars provide transportation for golfers around a golf course. A golf car must also securely carry a golf bag in a location for convenient access throughout a round of golf. Typically, the rearward portion of the golf car defines a golf bag carrier area that supports the golf bag or bags in a centrally upright orientation. In some golf car arrangements, a sand container such as a bucket or bottle may be retained near the golf bag carrier area, or elsewhere on the golf car. The sand container may include grass seed for applying to areas of damaged turf such as after a golf shot.

In one arrangement, a bucket may have a closeable lid and a removable scoop. In other arrangements, a sand bottle may be selectively retained in a vertical orientation by a mounting bracket. Typically such mounting brackets may surround the bottle entirely in an installed position such that it is difficult to access how much sand is available in the bottle. In addition, typically the sand bottle may be placed into the installed position simply by dropping the bottle vertically until a bottom portion lands on a horizontal platform of the bracket. As such, there is no gripping or locking action between the bottle and the bracket when placed in the installed position. In this way, there is no perceived feedback to the user that the bottle has been sufficiently retained by the bracket.

SUMMARY

A sand bottle assembly on a golf car includes a bottle and a mounting bracket. The bottle is defined by a longitudinal hollow body having a bottom portion and a top portion. The hollow body defines a vertical axis. A spout is formed at the top portion and is adapted to dispense sand contained in the hollow body. An extension portion is disposed along a sidewall of the hollow body. The extension portion includes a raised sidewall portion. The mounting bracket is adapted to be connected to the golf car and matingly receive the extension portion of the bottle in an installed position. The mounting bracket defines an engaging portion adapted to engage and retain the raised sidewall of the extension portion in a secure position along the vertical axis in the installed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the various embodiments is merely exemplary in nature and is in no way intended to limit the invention, its application, or uses.

Figure 1:
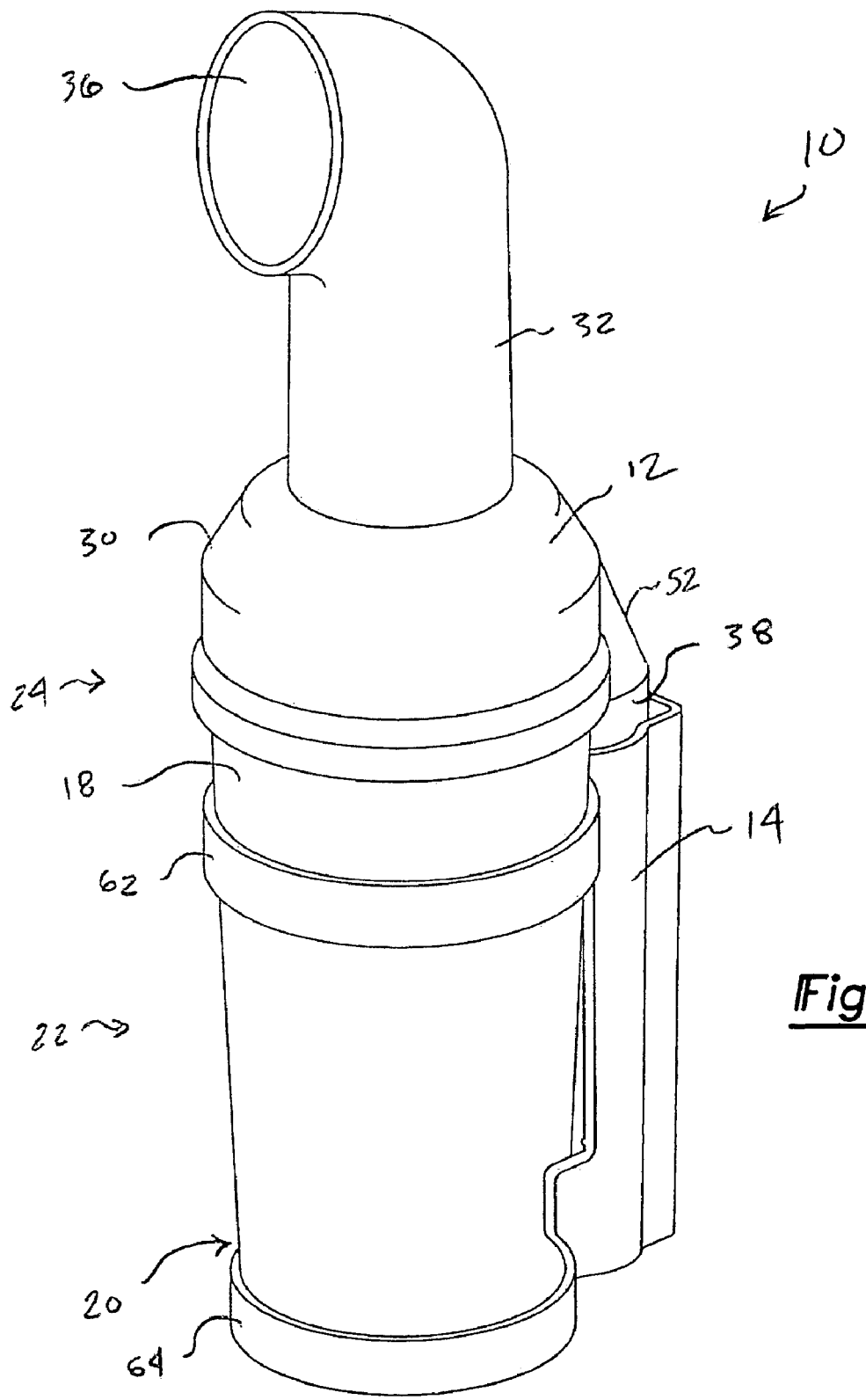
FIG. 1 is a perspective view of a sand bottle assembly according to the present teachings.

With initial reference to FIG. 1, a sand bottle assembly is shown and generally identified at reference numeral 10. The sand bottle assembly 10 includes a sand bottle 12 and a mounting bracket 14. The mounting bracket 14 may be mounted vertically in a secure position to a vehicle such as a golf car (not shown). As will be described in greater detail herein, the sand bottle 12 and mounting bracket 14 according to various embodiments each have cooperating features allowing the sand bottle 12 to be matingly received by the mounting bracket 14 in a secure installed position.

With continued reference to FIG. 1 and further reference to FIG. 2, the sand bottle 12 will be described in greater detail. The sand bottle 12 is generally defined by a longitudinal hollow body 18 having a bottom portion 20, an intermediate portion 22, and a top portion 24. The bottom portion 20 includes a bottom surface 26. The top portion 24 includes an annular shoulder portion 30 leading to a neck portion 32. In one embodiment, the top portion 24 may be removed from the rest of the sand bottle 12 to empty or refill the contents of the sand bottle 12. The neck portion 32 terminates at an opening defining a spout 36. The spout 36 can be generally oriented at a right angle with respect to the hollow body 18 of the bottle 12. It is appreciated that the shoulder portion 30 and/or spout 36 may be oriented differently.

Figure 2:
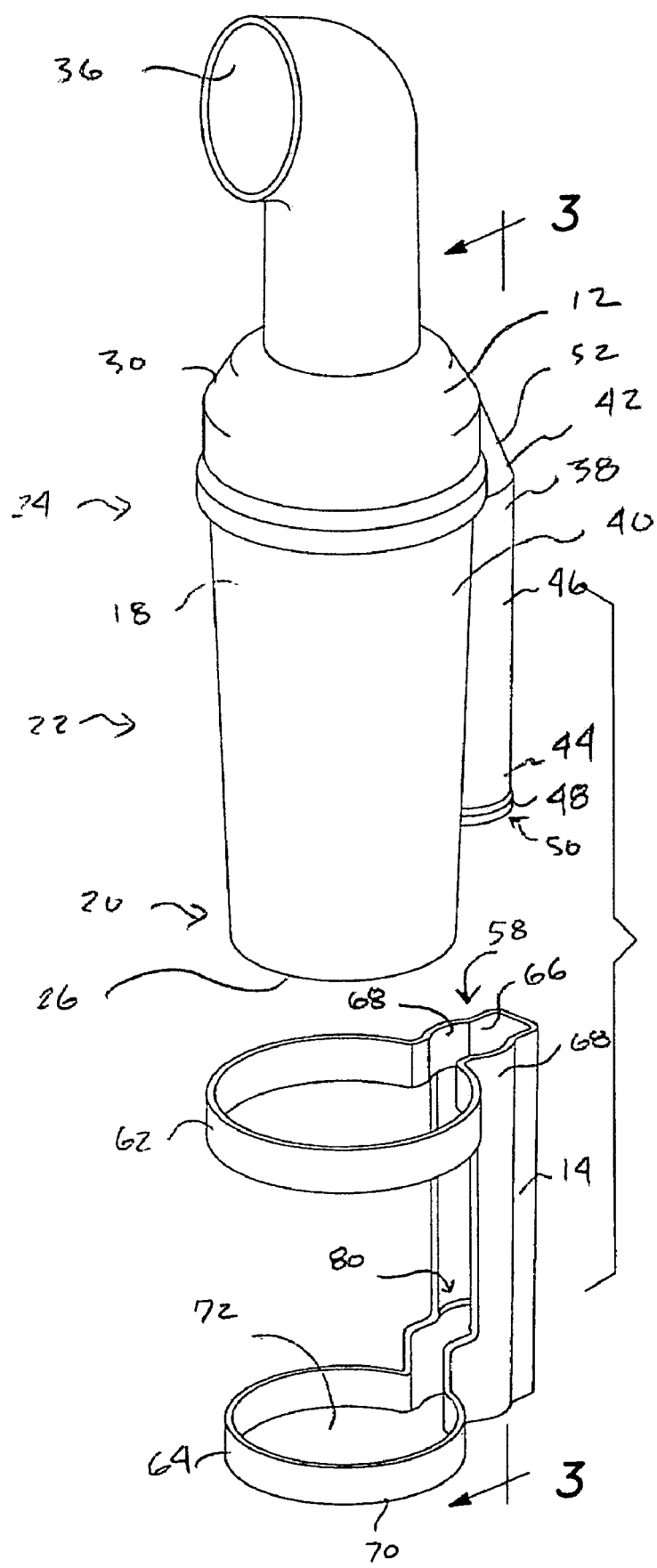
FIG. 2 is an exploded view of a sand bottle and bracket of the assembly shown in FIG. 1.

With specific reference now to FIG. 2, an extension portion 38 is formed along a sidewall 40 of the hollow body 18. The extension portion 38 extends from a first end 42 to a second end 44 defining a longitudinal member 46. The longitudinal member 46 may define a radial profile in the longitudinal plane from the first end 42 to the second end 44. The extension portion includes a raised sidewall 48. As used herein, the raised sidewall 48 may be referred to as a first engaging portion 50 for cooperating with the mounting bracket 14 in an installed position. The first end 42 includes a generally sloped section 52 leading from the annular shoulder portion 30 to the extension portion 38. As depicted in the drawings, the raised sidewall 48 is formed at the second end 44.

Figure 3:
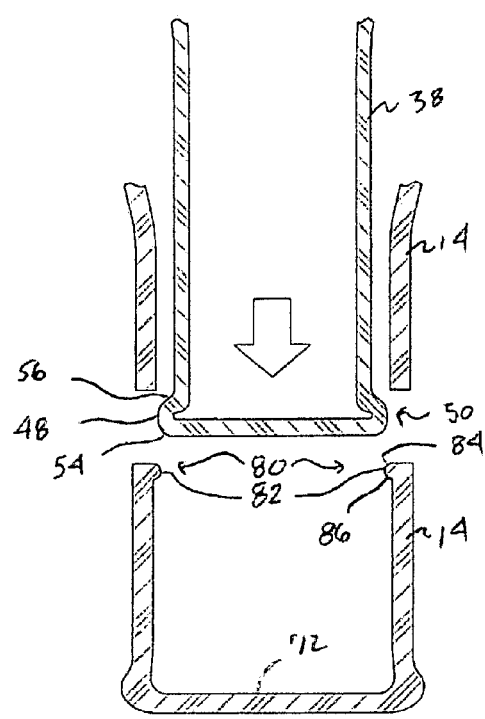
FIG. 3 is a sectional view taken along line 3-3 of FIG. 2 illustrating the bottle moving toward an installed position.
Figure 4:
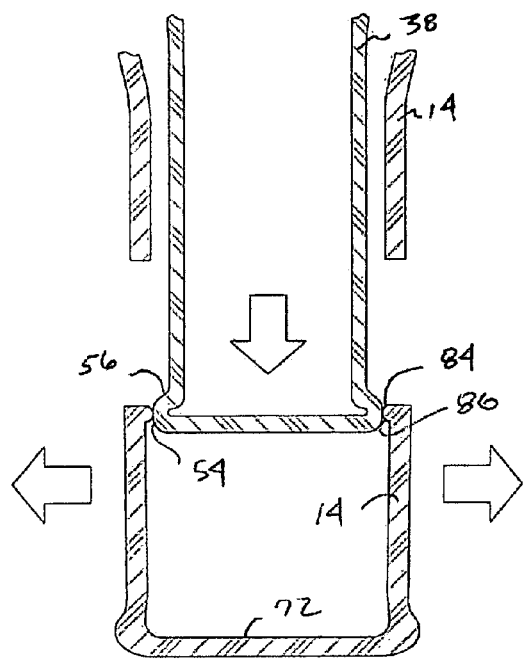
FIG. 4 is the sectional view of FIG. 3 shown with the bracket deflecting outwardly to accept the bottle as the bottle is advanced toward an installed position.

The raised sidewall 48 is further defined by a leading edge 54 and a trailing edge 56 (FIGS. 3 and 4). It is appreciated that the raised sidewall 48 may be formed elsewhere on the extension portion 38. Furthermore, while the raised sidewall 48 is illustrated as a continuous section of the longitudinal member 46 (FIGS. 3 and 4), the raised sidewall 48 may alternatively comprise a separate component suitably attached to the longitudinal member 46. The sand bottle 12 may be formed of a rigid lightweight material such as, but not limited to, polypropylene.

With reference now to all the FIGS., the mounting bracket 14 will now be described. The mounting bracket 14 generally includes a receiving slot 58, a lower platform 72, an upper retaining ring 62 and a lower retaining ring 64. The receiving slot 58 generally defines a u-channel 66. The u-channel 66 includes a pair of opposing annular sections 68. The upper retaining ring 62 connects on opposite ends to the opposing annular sections 68. The lower retaining ring 64 connects on a lower edge 70 the platform 72. A second engaging portion 80 is defined by an annular protrusion 82 formed around the annular sections 68. The annular protrusion 82 is further defined by an outboard radial surface 84 and an inboard radial surface 86. The mounting bracket 14 may be formed of a rigid material such as metal or polypropylene for example.

As will be described, the second engaging portion 80 of the mounting bracket 14 selectively mates with the first engaging portion 50 (raised sidewall 48) of the bottle 12 to retain the bottle 12 into the installed position. With specific reference to FIGS. 3-5, installation of the bottle 12 in the bracket 14 will now be described. At the outset, the bottom portion 20 of the sand bottle 12 is substantially aligned to be received by the upper retaining ring 62. Concurrently, the sand bottle 12 can be rotated around its vertical axis such that the extension portion 38 is substantially aligned to be received by the u-channel 66 of the mounting bracket 14. As a result, the orientation of the sand bottle 12 relative to the mounting bracket 14 may substantially resemble the configuration shown in FIG. 2.

Figure 5:
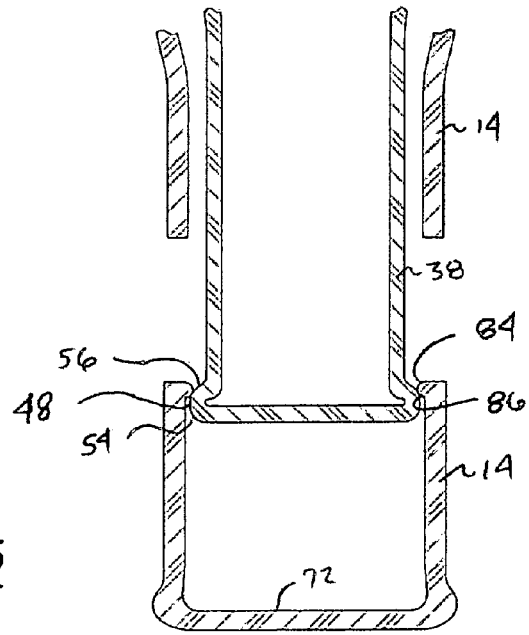
FIG. 5 is the sectional view of FIG. 3 shown with the bottle retained by the bracket in an installed position.

Next, the sand bottle 12 is advanced vertically downwardly such that the bottom portion 20 is received by the upper ring 62. The sand bottle 12 is then progressively advanced downwardly until the raised sidewall 48 of the longitudinal member 46 is captured under the annular protrusion 82 of the mounting bracket 14. More specifically, the leading edge 54 of the raised sidewall 48 initially engages the outboard radial surface 84 of the annular protrusion 82. As the bottle 12 is advanced downward, the annular protrusion 82 may deflect slightly outward as the raised sidewall 48 advances thereal-ong (FIG. 4). In some embodiments, the raised sidewall 48 alone, or alternatively, both of the annular protrusion 82 and the raised sidewall 48 may deflect slightly (the raised sidewall 48 deflecting inwardly) to allow the raised sidewall 48 to pass under the annular protrusion 82 (FIG. 5). A secure installed position is attained when the trailing edge 56 of the raised sidewall 48 is captured by the inboard radial surface 86 of the annular protrusion 82. The raised sidewall 48 of the bottle 12 and the annular protrusion 82 of the mounting bracket 14 define an interference fit in the installed position (FIG. 5). It is appreciated that advancing the bottle 12 into the installed position may provide feedback to the user during interaction between the respective first and second engaging portions 50, 80. In this way, the arrangement can provide positive feedback that the bottle 12 has been secured to the mounting bracket 14 in the installed position. As best illustrated in FIGS. 2-5, the raised sidewall 48 formed at the second end 44 of the extension portion 38 is offset from the bottom surface 26 of the bottle 12. As a result, the extension portion 38 is laterally spaced upward from the platform 72 in the installed position (FIG. 5).

To remove the sand bottle 12 from the mounting bracket 14, the bottle 12 is advanced upwardly such that the raised sidewall 48 may pass over the annular protrusion 82 of the mounting bracket 14. The bottle 12 is then further advanced upwardly until the bottom portion 20 clears the upper ring 62 of the bracket 14.

Those skilled in the art can now appreciate from the foregoing description that the broad teachings of the present invention can be implemented in a variety of forms. For example, while the first and second engaging portions have been described as a raised sidewall and an annular protrusion, respectively, other configurations are contemplated for attaining an interference fit between the bottle and the mounting bracket. Furthermore, while the first engaging portion has been described as part of the longitudinal member and the second engaging portion has been described as part of the u-channel, it is appreciated that they may be formed elsewhere on the bottle and bracket. For example, the raised sidewall may be formed entirely on the hollow body and the annular protrusion formed entirely on one of the rings. In such an example, the longitudinal member and u-channel may be excluded from the assembly. Therefore, while this invention has been described in connection with particular examples thereof, the true scope of the invention should not be so limited since other modifications will become apparent to the skilled practitioner upon a study of the drawings, the specification and the following claims.

What is claimed is:

1. A sand bottle assembly on a golf car comprising:
   a bottle defined by a substantially cylindrical longitudinal hollow body having a diameter defining an outer periphery, the bottle defining an opening formed thereon, the bottle having an extension portion extending parallel to the longitudinal hollow body and outside of the outer periphery, the extension portion defining a cavity for receiving sand;
   a first engaging portion defined on the bottle and defined by a raised sidewall extending generally transverse to a longitudinal axis of the hollow body and extending beyond the outer periphery of the longitudinal hollow body, the raised sidewall having a leading and trailing edge;
   a mounting bracket adapted to be connected to the golf car and receive the bottle in an installed position; and
   a second engaging portion defined by a protrusion formed on the mounting bracket adapted to slidably receive and retain the first engaging portion of the bottle in an interference fit.

2. The sand bottle assembly of claim 1 wherein the protrusion is defined by an annular protrusion on the mounting bracket.

3. The sand bottle assembly of claim 2 wherein the raised sidewall urges the annular protrusion outwardly during advancement of the bottle to the installed position.

4. The sand bottle of claim 3 wherein the annular protrusion of the mounting bracket contacts the trailing edge in the installed position.

5. A sand bottle assembly on a golf car comprising:
   a bottle defined by a substantially cylindrical longitudinal hollow body having a diameter and an opening formed thereon;
   an extension portion defining a longitudinal member extending generally parallel to an axis defined by the longitudinal hollow body of the bottle, the longitudinal member extending from a first end to a second end;
   a raised sidewall portion that extends beyond the diameter of the longitudinal hollow body on the extension portion of the bottle;
   a mounting bracket adapted to be connected to the golf car and receive the bottle in an installed position; and
   an engaging portion formed on the mounting bracket adapted to engage and retain the raised sidewall portion of the bottle in a secure position.

6. The sand bottle assembly of claim 5 wherein the raised sidewall portion creates an interference fit with the engaging portion of the mounting bracket in the installed position.

7. The sand bottle of claim 6 wherein the raised sidewall defines a leading edge and a trailing edge and wherein the engaging portion of the mounting bracket contacts the trailing edge in the installed position.

8. A sand bottle assembly on a golf car comprising:
   a bottle defined by a longitudinal hollow body having a bottom portion and a top portion, the longitudinal hollow body defining a vertical axis;

a spout formed at the top portion and adapted to dispense sand contained in the hollow body;

an extension portion disposed along a sidewall of the hollow body and defining a longitudinal member extending generally parallel to the vertical axis, the longitudinal member extending from a first end to a second end, the extension portion having a raised sidewall portion; and a mounting bracket adapted to be connected to the golf car and matingly receive the extension portion of the bottle in an installed position, wherein the mounting bracket defines an annular protrusion adapted to engage and retain the raised sidewall of the extension portion in a secure position along the vertical axis in the installed position the mounting bracket including an upper ring surrounding the upper portion of the bottle in the installed position and a lower ring surrounding the bottom portion of the bottle in the installed position.

9. The sand bottle of claim 8 wherein the longitudinal member generally defines a radial profile in a plane transverse to the vertical axis.

10. The sand bottle of claim 9 wherein the longitudinal member extends from a first end at an upper portion of the bottle to a second end at an intermediate portion of the bottle, wherein the second end of the longitudinal member is offset from the bottom portion of the bottle.

11. The sand bottle of claim 10 wherein the raised sidewall portion is formed at the second end of the longitudinal member.

12. The sand bottle of claim 10 wherein the raised sidewall portion creates an interference fit with the engaging portion of the mounting bracket in the installed position.

13. The sand bottle of claim 12 wherein the raised sidewall portion defines a leading edge and a trailing edge and wherein the engaging portion of the mounting bracket contacts the trailing edge in the installed position.

14. The sand bottle of claim 13 wherein the mounting bracket generally defines a u-channel and wherein the annular protrusion is formed thereon.

15. The sand bottle of claim 12 wherein the mounting bracket is operable to slidably receive the raised sidewall portion in a secure position as the bottle is advanced in a direction along the vertical axis.

16. The sand bottle assembly of claim 8 wherein the raised sidewall portion defines a first width and the engaging portion defines a second width, the first width being greater than the second width while the bottle is retained in the secure position.

17. A sand bottle assembly on a golf car comprising:

a bottle defined by a substantially cylindrical longitudinal hollow body having a diameter defining a periphery and an opening formed thereon;

a first engaging portion defined on the bottle and extending beyond the periphery defined by the longitudinal body, the longitudinal hollow body and defined by a raised sidewall extending generally transverse to a longitudinal axis of the hollow body, the raised sidewall defining a first width and having a leading and trailing edge;

a mounting bracket adapted to be connected to the golf car and receive the bottle in an installed position; and a second engaging portion defined by a protrusion defining a second width and formed on the mounting bracket, the second engaging portion adapted to slidably receive and retain the first engaging portion of the bottle in an interference fit, the first width being greater than the second width while in the interference fit.

18. The sand bottle assembly of claim 1 wherein the raised sidewall defines a first radius and the longitudinal hollow body defines a second radius wherein the first radius is less than the second radius.

19. The sand bottle assembly of claim 5 wherein the raised sidewall defines a first radius and the longitudinal hollow body defines a second radius wherein the first radius is less than the second radius.

20. The sand bottle assembly of claim 17 wherein the raised sidewall defines a first radius and the longitudinal hollow body defines a second radius wherein the first radius is less than the second radius.

* * * * *

UNITED STATES PATENT AND TRADEMARK OFFICE
CERTIFICATE OF CORRECTION

PATENT NO. : 7,490,805 B2
APPLICATION NO. : 11/373874
DATED : February 17, 2009
INVENTOR(S) : Richard Krall Page 1 of 1

It is certified that error appears in the above-identified patent and that said Letters Patent is hereby corrected as shown below:

Column 2, line 67, insert -- to -- after "lower edge 70".

Column 5, line 14, insert -- , -- after "position".

Signed and Sealed this

Ninth Day of June, 2009

JOHN DOLL
*Acting Director of the United States Patent and Trademark Office*